US010460338B2

(12) United States Patent
Redford et al.

(10) Patent No.: US 10,460,338 B2
(45) Date of Patent: Oct. 29, 2019

(54) NETWORK CENTRIC LOYALTY SYSTEM

(71) Applicant: Visa U.S.A. Inc., San Francisco, CA (US)

(72) Inventors: Liane Redford, San Mateo, CA (US); Bryan Shimko, Scottsdale, AZ (US); Loc Nguyen, Berkeley, CA (US); Ayman Hammad, Pleasanton, CA (US)

(73) Assignee: VISA U.S.A. INC., San Francisco, CA (US)

( * ) Notice: Subject to any disclaimer, the term of this patent is extended or adjusted under 35 U.S.C. 154(b) by 394 days.

(21) Appl. No.: 14/094,363

(22) Filed: Dec. 2, 2013

(65) Prior Publication Data
US 2014/0095288 A1    Apr. 3, 2014

Related U.S. Application Data

(63) Continuation of application No. 10/401,504, filed on Mar. 27, 2003, now Pat. No. 8,626,577.

(60) Provisional application No. 60/410,507, filed on Sep. 13, 2002.

(51) Int. Cl.
G06Q 30/02    (2012.01)
G06Q 30/00    (2012.01)
G06Q 20/38    (2012.01)

(52) U.S. Cl.
CPC ....... G06Q 30/0226 (2013.01); G06Q 20/387 (2013.01); G06Q 30/02 (2013.01); G06Q 30/0222 (2013.01); G06Q 30/0227 (2013.01); G06Q 30/0229 (2013.01); G06Q 30/0237 (2013.01); G06Q 30/0238 (2013.01); G06Q 30/0267 (2013.01)

(58) Field of Classification Search
CPC ............... G06Q 30/02; G06Q 30/0208; G06Q 30/0211; G06Q 30/0225; G06Q 30/0226; G06Q 30/0227; G06Q 30/0229; G06Q 30/0222; G06Q 30/0237; G06Q 30/0238; G06Q 30/0267
USPC ........................................................ 705/14.1
See application file for complete search history.

(56) References Cited

U.S. PATENT DOCUMENTS

| | | | |
|---|---|---|---|
| 3,935,933 | A | 2/1976 | Tanaka et al. |
| 4,011,433 | A | 3/1977 | Tateisi et al. |
| 4,108,350 | A | 8/1978 | Forbes, Jr. |
| 4,124,109 | A | 11/1978 | Bissell et al. |
| 4,195,864 | A | 4/1980 | Morton et al. |
| 4,412,631 | A | 11/1983 | Haker |

(Continued)

FOREIGN PATENT DOCUMENTS

| | | |
|---|---|---|
| AU | 200039412 A1 | 12/2000 |
| BE | 1002756 A6 | 5/1991 |

(Continued)

OTHER PUBLICATIONS

"Internet based secure transactions using encrypting applets and cgi-scripts Independent of browser or server capabilities"; 1998, *IBM Research Disclosure*, No. 410116, pp. 800-801.

*Primary Examiner* — Raquel Alvarez
(74) *Attorney, Agent, or Firm* — Kilpatrick Townsend & Stockton LLP

(57) ABSTRACT

A network centric system that enables participation by any number of entities including sponsors, issuers, merchants, portable devices, and acceptance point devices in one or more loyalty programs is provided. Any combination of entities may be specified for different loyalty programs.

21 Claims, 5 Drawing Sheets

(56) References Cited

U.S. PATENT DOCUMENTS

| | | |
|---|---|---|
| 4,544,590 A | 10/1985 | Egan |
| 4,568,403 A | 2/1986 | Egan |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,886 A | 1/1998 | Christensen et al. |
| 5,727,153 A | 3/1998 | Powell |
| 5,734,838 A | 3/1998 | Robinson et al. |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,657 A | 9/1998 | Williams et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,875,437 A | 2/1999 | Atkins |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,244 A | 6/1999 | Jack et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,963,924 A | 10/1999 | Williams et al. |
| 5,969,318 A | 10/1999 | Mackenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |
| 6,005,942 A | 12/1999 | Chan et al. |

(56) References Cited

U.S. PATENT DOCUMENTS

| | | | |
|---|---|---|---|
| 6,009,411 A | 12/1999 | Kepecs |
| 6,012,635 A | 1/2000 | Shimada et al. |
| 6,014,634 A | 1/2000 | Scroggie et al. |
| 6,016,484 A | 1/2000 | Williams et al. |
| 6,024,286 A | 2/2000 | Bradley et al. |
| 6,035,280 A | 3/2000 | Christensen |
| 6,038,551 A | 3/2000 | Barlow et al. |
| 6,041,309 A | 3/2000 | Laor |
| 6,047,325 A | 4/2000 | Jain et al. |
| 6,049,778 A | 4/2000 | Walker et al. |
| 6,052,468 A | 4/2000 | Hillhouse |
| 6,052,690 A | 4/2000 | de Jong |
| 6,052,785 A | 4/2000 | Lin et al. |
| 6,055,509 A | 4/2000 | Powell |
| 6,061,660 A | 5/2000 | Eggleston et al. |
| 6,067,526 A | 5/2000 | Powell |
| 6,070,147 A | 5/2000 | Harms et al. |
| 6,073,238 A | 6/2000 | Drupsteen |
| 6,076,068 A | 6/2000 | DeLapa et al. |
| 6,076,069 A | 6/2000 | Laor |
| 6,089,611 A | 7/2000 | Blank |
| 6,094,656 A | 7/2000 | De Jong |
| 6,101,422 A | 8/2000 | Furlong |
| 6,101,477 A | 8/2000 | Hohle et al. |
| 6,105,002 A | 8/2000 | Powell |
| 6,105,865 A | 8/2000 | Hardesty |
| 6,105,873 A | 8/2000 | Jeger |
| 6,112,987 A | 9/2000 | Lambert et al. |
| 6,112,988 A | 9/2000 | Powell |
| 6,119,933 A | 9/2000 | Wong et al. |
| 6,119,945 A | 9/2000 | Muller et al. |
| 6,122,631 A | 9/2000 | Berbec et al. |
| 6,129,274 A | 10/2000 | Suzuki |
| 6,144,948 A | 11/2000 | Walker et al. |
| 6,151,586 A | 11/2000 | Brown |
| 6,151,587 A | 11/2000 | Matthias |
| 6,154,751 A | 11/2000 | Ault et al. |
| 6,161,870 A | 12/2000 | Blank |
| 6,164,549 A | 12/2000 | Richards |
| 6,170,061 B1 | 1/2001 | Beser |
| 6,173,269 B1 | 1/2001 | Solokl et al. |
| 6,173,891 B1 | 1/2001 | Powell |
| 6,179,205 B1 | 1/2001 | Sloan |
| 6,179,710 B1 | 1/2001 | Sawyer et al. |
| 6,183,017 B1 | 2/2001 | Najor et al. |
| 6,185,541 B1 | 2/2001 | Scroggie et al. |
| 6,189,100 B1 | 2/2001 | Barr et al. |
| 6,189,878 B1 | 2/2001 | Dorf |
| 6,195,666 B1 | 2/2001 | Schneck et al. |
| 6,210,276 B1 | 4/2001 | Mullins |
| 6,216,014 B1 | 4/2001 | Proust et al. |
| 6,216,204 B1 | 4/2001 | Thiriet |
| 6,220,510 B1 | 4/2001 | Everett et al. |
| 6,222,914 B1 | 4/2001 | McMullin |
| 6,230,143 B1 | 5/2001 | Simons et al. |
| 6,237,145 B1 | 5/2001 | Narasimhan et al. |
| 6,241,287 B1 | 6/2001 | Best et al. |
| 6,243,687 B1 | 6/2001 | Powell |
| 6,243,688 B1 | 6/2001 | Kalina |
| 6,244,958 B1 | 6/2001 | Acres |
| 6,266,647 B1 | 7/2001 | Fernandez |
| 6,267,263 B1 | 7/2001 | Emoff et al. |
| 6,269,158 B1 | 7/2001 | Kim |
| 6,279,112 B1 | 8/2001 | O'Toole, Jr. et al. |
| 6,282,516 B1 | 8/2001 | Giuliani |
| 6,292,785 B1 | 9/2001 | McEvoy et al. |
| 6,292,786 B1 | 9/2001 | Deaton et al. |
| 6,296,191 B1 | 10/2001 | Hamann et al. |
| 6,298,336 B1 | 10/2001 | Davis et al. |
| 6,299,530 B1 | 10/2001 | Hansted et al. |
| 6,321,208 B1 | 11/2001 | Barnett et al. |
| 6,385,723 B1 | 5/2002 | Richards |
| 6,390,374 B1 | 5/2002 | Carper et al. |
| 6,480,935 B1 | 11/2002 | Carper et al. |
| 6,549,773 B1 | 4/2003 | Linden et al. |
| 6,549,912 B1 | 4/2003 | Chen |
| 6,612,490 B1 | 9/2003 | Herrendoerfer et al. |
| 6,681,995 B2 | 1/2004 | Sukeda et al. |
| 6,689,345 B2 | 2/2004 | Jager Lezer |
| 8,626,577 B2 * | 1/2014 | Redford et al. ............ 705/14.1 |
| 2001/0016827 A1 | 8/2001 | Fernandez |
| 2001/0034775 A1 | 10/2001 | Minowa |
| 2002/0002468 A1 | 1/2002 | Spagna et al. |
| 2002/0026348 A1 * | 2/2002 | Fowler et al. ................ 705/10 |
| 2002/0062249 A1 * | 5/2002 | Iannacci ................ G06Q 20/10 |
| | | 705/14.1 |
| 2002/0076051 A1 | 6/2002 | Nii |
| 2003/0158818 A1 | 8/2003 | George et al. |
| 2012/0059741 A1 * | 3/2012 | Khan ..................... G06Q 30/06 |
| | | 705/27.1 |
| 2017/0169441 A1 * | 6/2017 | Ghosh ................ G06Q 30/0201 |

FOREIGN PATENT DOCUMENTS

| | | |
|---|---|---|
| CA | 2293944 A1 | 8/2000 |
| CA | 2267041 A1 | 9/2000 |
| CA | 2317138 A1 | 1/2002 |
| DE | 19522527 A1 | 1/1997 |
| DE | 19848712 A1 | 4/2000 |
| DE | 19960978 A1 | 8/2000 |
| DE | 10015103 A1 | 10/2000 |
| EP | 0203424 A2 | 12/1986 |
| EP | 0292248 A2 | 11/1988 |
| EP | 0475837 A1 | 3/1992 |
| EP | 0540095 A1 | 5/1993 |
| EP | 0658862 A2 | 6/1995 |
| EP | 0675614 A1 | 10/1995 |
| EP | 0682327 A2 | 11/1995 |
| EP | 0875841 A2 | 11/1998 |
| EP | 0936530 A1 | 8/1999 |
| EP | 0938050 A2 | 8/1999 |
| EP | 0938051 A2 | 8/1999 |
| EP | 0944007 A2 | 9/1999 |
| EP | 0949595 A2 | 10/1999 |
| EP | 0982692 A2 | 3/2000 |
| EP | 0984404 A2 | 3/2000 |
| EP | 1085395 A2 | 3/2001 |
| EP | 1102320 A1 | 5/2001 |
| EP | 1111505 A1 | 6/2001 |
| EP | 1113387 A2 | 7/2001 |
| EP | 1113407 A2 | 7/2001 |
| EP | 1168137 A1 | 1/2002 |
| EP | 1233333 A1 | 8/2002 |
| FR | 2772957 A1 | 6/1999 |
| FR | 2793048 A1 | 11/2000 |
| FR | 2794543 A1 | 12/2000 |
| FR | 2796176 A1 | 1/2001 |
| FR | 2804234 A1 | 7/2001 |
| GB | 2331381 A | 5/1999 |
| GB | 2343091 A | 4/2000 |
| GB | 2351379 A | 12/2000 |
| GB | 2355324 A | 4/2001 |
| JP | 2000-112864 A | 4/2000 |
| JP | 2000-181764 A | 6/2000 |
| JP | 2001-202484 A | 7/2001 |
| JP | 2001-236232 A | 8/2004 |
| KR | 20010039297 A | 5/2001 |
| KR | 20010044823 A | 6/2001 |
| KR | 20010058742 A | 7/2001 |
| KR | 20020021237 A | 3/2002 |
| WO | 90/016126 A1 | 12/1990 |
| WO | 96/025724 A1 | 8/1996 |
| WO | 96/038945 A1 | 12/1996 |
| WO | 96/042109 A1 | 12/1996 |
| WO | 97/005582 A1 | 2/1997 |
| WO | 97/010562 A1 | 3/1997 |
| WO | 97/039424 A1 | 10/1997 |
| WO | 98/002834 A1 | 1/1998 |
| WO | 98/009257 A1 | 3/1998 |
| WO | 98/020465 A1 | 5/1998 |
| WO | 98/043169 A2 | 10/1998 |
| WO | 98/043212 A1 | 10/1998 |
| WO | 98/052153 A2 | 11/1998 |
| WO | 99/010824 A1 | 3/1999 |

(56) References Cited

FOREIGN PATENT DOCUMENTS

| | | | |
|---|---|---|---|
| WO | 99/016030 | A1 | 4/1999 |
| WO | 99/019846 | A2 | 4/1999 |
| WO | 99/044172 | A1 | 9/1999 |
| WO | 99/045507 | A1 | 9/1999 |
| WO | 99/049415 | A2 | 9/1999 |
| WO | 99/049426 | A1 | 9/1999 |
| WO | 00/039714 | A1 | 7/2000 |
| WO | 00/046665 | A2 | 8/2000 |
| WO | 00/054507 | A1 | 9/2000 |
| WO | 00/057315 | A2 | 9/2000 |
| WO | 00/057613 | A1 | 9/2000 |
| WO | 00/062265 | A1 | 10/2000 |
| WO | 00/062472 | A1 | 10/2000 |
| WO | 00/067185 | A1 | 11/2000 |
| WO | 00/068797 | A1 | 11/2000 |
| WO | 00/068902 | A1 | 11/2000 |
| WO | 00/068903 | A1 | 11/2000 |
| WO | 00/069183 | A2 | 11/2000 |
| WO | 00/075775 | A2 | 12/2000 |
| WO | 00/077750 | A1 | 12/2000 |
| WO | 00/079411 | A2 | 12/2000 |
| WO | 01/004851 | A1 | 1/2001 |
| WO | 01/006341 | A1 | 1/2001 |
| WO | 01/008087 | A1 | 2/2001 |
| WO | 01/013572 | A1 | 2/2001 |
| WO | 01/015397 | A1 | 3/2001 |
| WO | 01/018633 | A1 | 3/2001 |
| WO | 01/018746 | A1 | 3/2001 |
| WO | 01/029672 | A1 | 4/2001 |
| WO | 01/033390 | A2 | 5/2001 |
| WO | 01/040908 | A2 | 6/2001 |
| WO | 01/042887 | A2 | 6/2001 |
| WO | 01/044900 | A2 | 6/2001 |
| WO | 01/044949 | A2 | 6/2001 |
| WO | 01/047176 | A1 | 6/2001 |
| WO | 01/050229 | A2 | 7/2001 |
| WO | 01/052575 | A1 | 7/2001 |
| WO | 01/055955 | A1 | 8/2001 |
| WO | 01/059563 | A1 | 8/2001 |
| WO | 01/061620 | A1 | 8/2001 |
| WO | 01/065545 | A2 | 9/2001 |
| WO | 01/067694 | A1 | 9/2001 |
| WO | 01/071648 | A2 | 9/2001 |
| WO | 01/071679 | A2 | 9/2001 |
| WO | 01/073530 | A2 | 10/2001 |
| WO | 01/073533 | A1 | 10/2001 |
| WO | 01/078020 | A1 | 10/2001 |
| WO | 01/080563 | A1 | 10/2001 |
| WO | 01/084377 | A2 | 11/2001 |
| WO | 01/084474 | A2 | 11/2001 |
| WO | 01/084512 | A1 | 11/2001 |
| WO | 01/088705 | A1 | 11/2001 |
| WO | 02/006948 | A1 | 1/2002 |
| WO | 02/010962 | A1 | 2/2002 |
| WO | 02/014991 | A2 | 2/2002 |
| WO | 02/015037 | A1 | 2/2002 |
| WO | 02/021315 | A1 | 3/2002 |
| WO | 02/029577 | A2 | 4/2002 |
| WO | 02/088895 | A2 | 11/2002 |

* cited by examiner

NETWORK CENTRIC LOYALTY SYSTEM

CROSS-REFERENCES TO RELATED APPLICATIONS

This U.S. non-provisional application is a continuation of U.S. patent application Ser. No. 10/401,504, filed on Mar. 27, 2003, which claims priority from Provisional Patent Application No. 60/410,507, filed Sep. 13, 2002, which is incorporated by reference in its entirety for all purposes.

BACKGROUND OF THE INVENTION

The present invention generally relates to loyalty transactions and, more specifically, to a network centric loyalty system that offers a multitude of network-centric loyalty programs and loyalty transactions.

Loyalty programs are programs that provide customers with incentives to perform transactions at certain merchants participating in the loyalty programs. Typically, customers are awarded incentives under a loyalty program when they perform transactions at the merchants participating in that loyalty program. The incentives may then be redeemed instantly or at a later time. Generally, loyalty programs are typically deployed on loyalty systems based on either a merchant-centric model or an issuer-centric model.

Generally, in the merchant-centric model, a merchant operates a closed loyalty program. The merchant defines all incentives to be issued within the program and issues portable consumer devices, such as smart cards, that identify a cardholder to the system when shopping in the merchant's stores. The merchant-centric loyalty systems are generally designed to generate additional purchase volume for a single merchant. Additionally, the merchant-centric system operates a proprietary, closed program because it is essential to the business model to maintain tight control over all program participants and to restrict the variety of incentives in order to manage the overall costs to the program sponsor.

In the issuer-centric model, multiple relationships are established with the various entities that are capable of adding values to a loyalty points pool available to a cardholder of a single issuer. In general, points can be redeemed only through the issuer. Issuer-centric loyalty systems are generally designed to provide points or incentives to registered cardholders in order to create an incentive for the cardholders to use the single issuer's services and/or the facilities of the issuer's partners that offer complementary products or services.

Both the issuer-centric and merchant-centric models have their respective drawbacks. For example, a merchant-centric model does not support multiple card issuers or other merchants and loyalty only benefits the merchant who funds the infrastructure, not the issuer. Additionally, because a merchant funds the startup cost of the loyalty system infrastructure and operations as well as all of the incentives, a loyalty program is generally limited to discounts on distinct products that can be readily stockpiled in anticipation of incentive redemption under the loyalty program.

In the issuer-centric model, multiple card issuers must fund the entire costs of infrastructure, have limited transaction information, must acquire and contract with acceptance point providers and cannot easily migrate from existing programs but must restart from scratch. Also, there is very little incentive to provide the flexibility for other participants to craft and offer customized incentives. With similar limited benefits to participants, the issuer-centric model offers loyalty benefits only to the issuer, not the merchant.

Additionally, loyalty only benefits the issuer or merchant but does not benefit any third party such as manufacturers other merchants or operators. The third party may include transaction acquirers and credit card associations. As a result, cross-loyalty program participation cannot be easily accommodated. Also, both models provide only minimal ability for participants to offer incentives that have been customized for a cardholder, a segment of cardholders, or specific group of acceptance point terminals.

Hence, it would be desirable to provide a more robust and flexible model for loyalty programs.

BRIEF SUMMARY OF THE INVENTION

Embodiments of the present invention relate to a network centric system that enables participation by any number of entities including sponsors, issuers, merchants, portable devices, and acceptance point devices in one or more loyalty programs. Any combination of entities may be specified for different loyalty programs.

In one embodiment, a system for providing a loyalty program for a plurality of merchants and a plurality of issuers is provided. The system comprises: a host configured to maintain an issuer identifier for each of the plurality of issuers and to maintain a plurality of loyalty parameters for the loyalty program, the plurality of loyalty parameters associated with at least one issuer identifier; a portable device associated with an issuer in the plurality of issuers, wherein the portable device includes one or more portable device parameters and a portable device identifier associated with the corresponding issuer identifier of the associated issuer of the portable device; and an acceptance point device associated with a merchant in the plurality of merchants, the acceptance point device including each issuer identifier maintained by the host and one or more of the plurality of maintained loyalty parameters maintained by the host; wherein the acceptance point device is configured to communicate with the portable device to determine the portable device identifier and associate the determined portable device identifier with the corresponding issuer identifier for the associated issuer of the portable device; and wherein the acceptance point device is further configured to associate the one or more portable device identifier parameters with the one or more of the plurality of maintained loyalty parameters associated with the associated issuer identifier.

In one embodiment, a method for providing a loyalty program for a plurality of merchants and a plurality of issuers is provided. The method comprises: providing an issuer identifier to an issuer in the plurality of issuers, the issuer identifier usable to generate a portable device identifier for a portable device issued by the issuer; and providing the issuer identifier and one or more loyalty parameters associated with the issuer identifier to an acceptance point device associated with a merchant in the plurality of merchants; wherein the issuer identifier enables the acceptance point device to associate the portable device identifier for the portable device with the issuer when the portable device identifier is determined from communications between the portable device and the acceptance point device; and wherein the one or more loyalty parameters enable the acceptance point device to determine if the portable device is eligible for the loyalty program.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

I. System Overview

Figure 1:
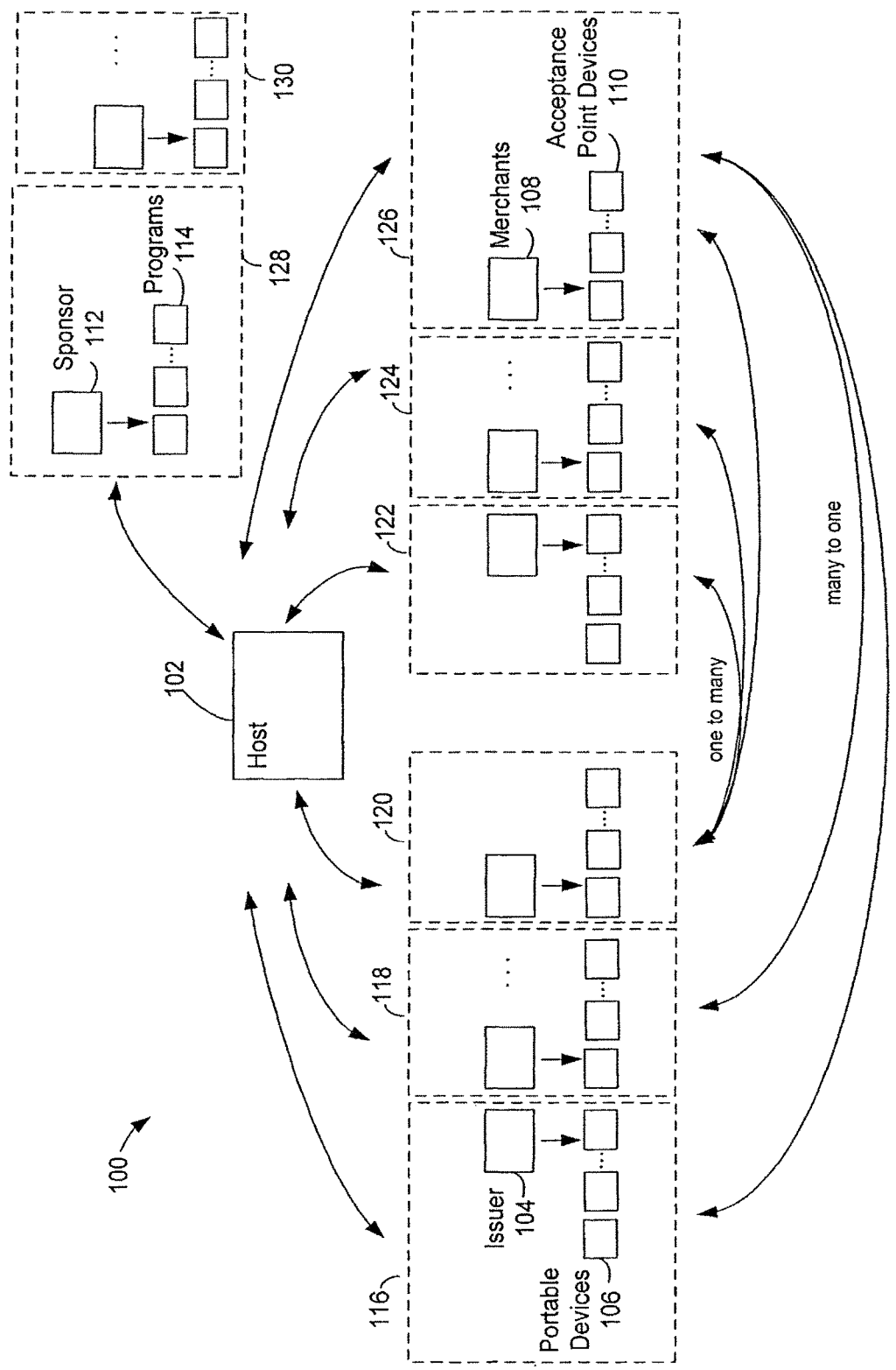
FIG. 1 is a simplified block diagram illustrating a network-centric system for deploying a network-centric loyalty program according to one exemplary embodiment of the present invention.

FIG. 1 illustrates a network-centric system 100 for deploying a network-centric loyalty program according to one exemplary embodiment of the present invention. System 100 includes a host 102, one or more issuers 104, one or more portable devices 106, one or more merchants 108, one or more acceptance point devices 110, one or more sponsors 112, and one or more loyalty programs 114. Entities in system 100 communicate through any number of communication media, such as the Internet, a wireless network, a wireline network, and the like. Entities that may be related are shown in dotted boxes. For example, each issuer/portable devices grouping 116, 118, and 120 includes an issuer 104 that is associated with one or more portable devices 106. Also, each merchant/acceptance point devices grouping 122, 124, and 126 includes a merchant 108 that is associated with acceptance point devices 110; and each sponsor/programs grouping 128 and 130 includes a sponsor 112 that is associated with programs 114.

Host 102 is the central provider of one or more loyalty programs 114 in system 100. For example, host 102 is a credit card association, such as Visa. Although only one host 102 is shown, it should be understood that a number of hosts 102 may be included within system 100. Host 102 is used to enroll multiple issuers 104 with their respective portable devices 106, multiple merchants 108 with their respective acceptance point devices 110 and, optionally, multiple sponsors 112 into network-centric system 100. Thus, any combination of issuers 104, merchants 108, sponsors 112, portable devices 106, and acceptance point devices 110 may participate in one or more loyalty programs 114 provided by host 102. In one exemplary embodiment, host 102 includes dedicated hardware, software, embedded software, or any combination thereof, to deploy network-centric system 100 and the loyalty programs 114.

Issuers 104 are entities that issue portable devices 106. For example, issuers 104 include a bank that issues portable devices 106. Each issuer 104 can introduce any number of portable devices 106 into system 100 provided that portable devices 106 are registered with host 102. Each portable device 106 is uniquely identified with an identifier within system 100, making it possible for host 102 to track and manage each portable device 106 accordingly.

Portable devices 106 are devices that are used by loyalty program participants to conduct loyalty transactions. For example, portable devices 106 include smartcards, cellular phones, personal digital assistants (PDAs), pagers, payment cards, security cards, access cards, smart media, transponders, and the like. Each issuer 104 issues its own portable devices 106 to its customers. As will be further described below, each portable device 106 includes a loyalty module, such as a computer chip with dedicated hardware, software, embedded software, or any combination thereof, that is used to perform actions associated with loyalty transactions.

Merchants 108 are entities that support acceptance point devices 110. For example, merchants 108 are stores or dealers selling products and/or services to customers with portable devices 106. Merchants 108 operate their own acceptance point devices 110. Each merchant 108 can introduce any number of acceptance point devices 110 into system 100 provided that acceptance point devices 110 are registered with host 102. Each acceptance point device 110 is uniquely identified with an identifier within system 100, making it possible for host 102 to disseminate and track any loyalty programs 114 to any acceptance point devices 110 of merchants 108.

Acceptance point devices 110 include devices that are capable of communicating with portable devices 106. For example, acceptance point devices 110 include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. In one embodiment, acceptance point devices 110 communicate with portable devices 106 to facilitate loyalty transactions. Also, acceptance point devices 110 communicate with host 102 on a substantially scheduled basis in one embodiment, based on a frequency pre-determined by a party to facilitate loyalty programs 114 and to provide information about loyalty transactions conducted with portable devices 106.

Sponsors 112 are any entities, such as product manufacturers, that can sponsor a loyalty program 114. Sponsors typically define the parameters of how loyalty program 114 is provided. Conventionally in the merchant-centric and issuer-centric models, the sponsor of a loyalty program that was offered in each respective model was restricted to the merchant or issuer, respectively. Using system 100, as will be further described below, sponsors 112 may be any entity, such as any issuer 104, merchants 108, or any other third party including, for example, a credit card association. Thus, a loyalty program 114 may be offered under an open system involving multiple entities.

It should be noted that issuers 104, merchants 108 and sponsors 112 as described herein are logical roles that can be assumed by an entity within the system 100. Based on the disclosure and teachings provided herein, a person of ordinary skill in the art will appreciate that an entity is capable of assuming one, two, or all three roles within the system 100 at the same time. For example, an entity can both be an issuer 104 and a merchant 108 within the system 100 in that the entity can issue its own portable devices to its customers as well as support its own acceptance point devices 110.

II. Loyalty Programs

A. Role of Host 102

Under system 100, host 102 is able to maintain and manage multiple loyalty programs 114 for multiple parties. More specifically, host 102 is able to allow one or more sponsors, including but not limited to issuers 104, merchants 108, and third party sponsors, to collectively sponsor a loyalty program 114; in addition, host 102 is also able to allow a single party or multiple parties to sponsor one or more loyalty programs 114. The number of parties that sponsor a loyalty program 114 and the number of loyalty programs 114 that can be sponsored by a party are unrestricted but may depend on many different factors, such as, the design and system constraints and requirements. For example, system 100 allows issuers 104 and merchants 108 to participate in a common incentive scheme with highly customizable individual or group-sponsored incentives. Each loyalty program 114 can be sponsored by a selected number of merchants 108, a selected number of issuers 104, and/or a selected number of third parties, such as product manufacturers or a loyalty program owner. The loyalty programs 114 can also be designed for a segment of customers in possession of portable devices 106 or made available for all customers in possession of portable devices 106.

Host 102 is the central management location for all loyalty programs 114 in system 100. The loyalty transactions conducted amongst portable devices 106 and acceptance point devices 110 are managed centrally in host 102. Host 102 defines and facilitates loyalty program policies and/or rules, sponsor and/or participant fee assessments, and fund settlements amongst all sponsors and participants in loyalty programs 114. Host 102 also provides centralized program management, reporting, servicing and other functionality in connection with managing loyalty programs 114.

Host 102 stores and manages the information that is used to manage a loyalty program 114 and defines which portable devices 106 for each issuer 104 and/or acceptance point devices 110 of each merchant 108 are eligible for loyalty programs 114. For example, one or more loyalty programs 114 may be developed and managed for one or more sponsors 112 that are directed to certain portable devices 106 and acceptance point devices 110. Parameters for a loyalty program 114 may include discount information, the products involved, the issuers, merchants and/or other sponsoring parties involved, the start and end dates of the program, card group numbers, etc. The parameters include any parameters that may be used to provide loyalty program 114. It should be understood that these parameters are provided for illustration purposes only and a person of ordinary skill in the art will appreciate other parameters that may be used. Host 102 is able to define incentives in loyalty program 114 that are targeted exclusively for a selected number of customers identified by their portable devices 106. In addition, host 102 communicates corresponding selective loyalty parameters for loyalty programs 114 to acceptance point devices 110. As will be further described below, by having certain loyalty parameters available on an acceptance point device 110, the acceptance point device 110 can facilitate managing of the appropriate loyalty programs 114. Also, host 102 is able to define incentives and also provide specification of selected acceptance point device 110 for specific loyalty programs 114.

B. Interaction of Components in System 100

In order to operate an open network centric system, host 102 enables any portable devices 106 to interact with any acceptance point devices 110. Also, any portable devices 106 for any issuer 104 may be eligible for any loyalty programs 114 that have been sponsored by any sponsors 112. For example, as depicted in FIG. 1, one-to-many and many-to-one relationships may be enabled. The one-to-many relationships means that portable devices 106 from issuer 104 in issuer/portable devices grouping 120 may interact with and be eligible for loyalty programs 114 at many different merchants 108 and their respective acceptance point devices 110, such as merchant/acceptance point devices groupings 122, 124, and 126. Also, a many-to-one relationship may be enabled. The many-to-one relationship means that multiple portable devices 106 associated with multiple issuers 104, such as issuer/portable devices 116 and 118, may interact with and be eligible for loyalty programs 114 at acceptance point devices 110 associated with a single merchant 108, such as merchant/acceptance point devices grouping 126.

In one embodiment, entities depicted in FIG. 1, such as issuers 104, portable devices 106, merchants 108, loyalty programs 114, and acceptance point devices 110 have identifiers associated with them. Each identifier includes any information that may be used to uniquely identify each entity. Also, the identifiers may each include information that may be used to enable participation in loyalty programs 114 for that particular entity. These identifiers are used by host 102 to manage loyalty programs 114. For example, the identifiers are used by host 102 to download information to specific acceptance point devices 110 and portable devices 106. Also, the identifiers may be used to determine loyalty programs 114 that a portable device 106 is eligible for during a transaction with an acceptance point device 110.

The process of creating a loyalty program 114 in accordance with an exemplary embodiment of the present invention will now be described. Loyalty program 114 is created by one or more sponsors 112 and has an identifier associated with it. Loyalty program 114 includes information specifying components, such as information that is used to determine which entities are eligible for participation in loyalty program 114. For example, identifiers for specific issuers 104, portable devices 104, merchants 106, and acceptance point devices 110 are determined for loyalty program 114. In addition to the identifiers, the loyalty program information may include loyalty program parameters that are used to define the terms of loyalty program 114, such as the incentives, dates of validity, number of uses in order to qualify for the incentives, and any other parameters needed for loyalty program 114. Accordingly, by identifying the identifiers for the entities eligible for loyalty program 114, the eligible entities can participate in loyalty program 114 as defined by the loyalty parameters. The above information may be downloaded to selected acceptance point devices 110 and associated with a loyalty program identifier. Also, any of the components of loyalty program 114 may be changed at any time. Thus, different entities may be included in a loyalty program 114 by changing the identifiers eligible for loyalty program 114 and also the parameters defining loyalty program 114 may be changed. These changes may then be downloaded to the acceptance point device on a scheduled basis, based on a frequency pre-determined by device owner and host operator.

In one exemplary embodiment, each issuer 104 is associated with a unique identifier and is offered a method to generate the identifiers for portable devices 106 that link them back to the issuer. Each portable device 106 for an issuer 104 will have a unique identifier that links it back with the identifier of that issuer 104. In order to enable participation in loyalty programs 114, the issuer identifier and identifiers for portable devices 106 are registered with host 102. In one exemplary embodiment, a third party may generate the issuer identifier and corresponding portable device identifiers. In this case, the identifiers would be downloaded to host 102 and issuers 104. In another exemplary embodiment, issuer 104 may generate or receive from host 102 an issuer identifier and then generate portable device identifiers with the issuer identifier. The portable device identifiers and possibly issuer identifier would then be communicated to host 102. In yet another exemplary embodiment, host 102 can generate the issuer and portable device identifiers and download them to issuer 102.

The identifier for each portable device 106 includes information that uniquely links it back to the issuer. Such information may be a card serial number, account number, PIN, primary account number (PAN) or any other information. The identifier is also used while establishing a trust relationship with acceptance point device 110 to determine the loyalty programs 114, portable device 106 is eligible for. In one example, elements of information of the identifier may include portable device parameters that are used to qualify loyalty programs 114 in which specific portable devices 106 are eligible. For example, each portable device 106 includes parameters that indicate one or more card group. Each card group can be represented by a number, i. There may be any number of card groups, such as card groups "1-N". If issuer 104 desires that one portable device 106 should be eligible for loyalty programs 114 associated with card groups "1" and "3", parameters indicating card groups "1" and "3" are stored on that portable device 106 and will have been downloaded to selected acceptance point devices 110. Information for loyalty programs 114 associated with card groups "1" and "3" is stored at host 102 and then distributed to various acceptance point devices 110 for processing of incentives. Thus, as will be further described below, when the portable device 106 with parameters indicating card groups "1" and "3" engages in a loyalty transaction at acceptance point device 110, acceptance device 110 is able to determine that this portable device 106 is eligible to participate in loyalty programs 114 based on its link to the issuer 104.

When parameters for multiple loyalty programs 114 are defined, they are forwarded to host 102 which downloads information for loyalty programs 114 to the appropriate acceptance point devices 110. To define the routes to the acceptance point devices 110 or groups of acceptance point devices, host 102 will submit data for loyalty programs 114 to each participating merchant 108 further forwarding loyalty programs 114 to acceptance point devices 110. Also, specific groupings for acceptance point devices 110 associated with each participating merchant 108 may be defined. In other embodiments, it may be defined that all acceptance point devices 110 for a participating merchant 108 will participate in loyalty program 114. Also, each loyalty program 114 includes information that is usable to determine which portable devices 106 for an associated issuer 104 are eligible for each loyalty program 114. For example, each loyalty program 114 includes an identifier for each issuer 104 that is participating in that program 114. Further, each loyalty program 114 includes at least one card group that will be used to identify which portable devices 106 for each participating issuer 104 are eligible for that loyalty program 114. Thus, a portable device 106 is eligible for a specific loyalty program 114 if its issuer identifier and card group match the issuer identifier and card group associated with that loyalty program 114. In other embodiments, each unique identifier for an eligible portable device 106 may be included in the information to determine which portable devices 106 are eligible for loyalty program 114.

Accordingly, in order to determine if a portable device 106 is eligible for a loyalty program 114, acceptance point device 110 and portable device 106 communicate to determine a portable device identifier and portable device parameters may be determined. The portable device parameters are then used to determine which loyalty programs 114 portable device 106 is eligible for. For example, the portable device parameters may include any card group numbers associated with portable device 106. An issuer identifier determined from the portable device identifier and card group numbers for portable device 106 are then used to identify loyalty programs 114 the associated portable device 106 may be eligible for. For example, the portable device parameters may indicate that portable device 106 is associated with card groups "1" and "3". Acceptance point device 110 then identifies loyalty programs 114 that are associated with card groups "1" and "3" for the issuer 104 having the issuer identifier. The loyalty transaction is then processed and appropriate incentives are issued based on the eligible loyalty programs 114 for portable device 106.

Accordingly, host 102 is configured to manage the issuer identifiers that are associated with issuers 104, the portable device identifiers that are generated from each issuer identifier to portable devices 106 of each issuer 104, and the loyalty parameters and information for loyalty programs 114. Host 102 also propagates and periodically updates loyalty program information to merchants 108 and their respective acceptance point devices 110. Even though host 102 communicates information including the issuer identifier and the portable device identifiers, host 102 may use an appropriate encryption/decryption algorithm and security protocols to maintain the privacy of portable devices 106, acceptance point devices 110, merchants 108, and issuers 104. Host 102 can manage universal identification of portable devices 106 and acceptance point devices 110.

C. Description of Methods Used to Develop Trust in System 100

In one exemplary embodiment, a system of trust is developed in system 100. Because host 102 operates an open loyalty system, entities in system 100 need to trust that other entities are authentic. The trust that is built is between each entity and host 102. Conventionally, if multiple links between merchants and issuers need to be setup, trust would be established one by one between a merchant and an issuer; however, in system 100, a merchant 108 is not required to setup an individual trust model with each issuer 104 since host 102 is relied upon to establish trust among all entities by distributing a root credential that links each entity back to host 102 and allows all entities to validate its link to the root host 102.

In one exemplary embodiment, a root credential, such as a root key, is generated and associated with host 102. This root credential is securely stored. From the root credential, an issuer credential, such as an issuer key, which is unique for each issuer 104, is derived. The issuer credential is derived in a way it can be associated with the root credential. The issuer credential is then communicated to each corresponding issuers 104. Each issuer uses its credential to derive unique portable device credentials. The portable device credential is derived in such a way that it can be associated with its associated issuer credential and thus the root credential. Usually each issuer 104 generates its own portable device credentials upon receiving its own unique issuer credential.

From the root credential, a merchant credential, such as merchant key, which is unique for merchant 108, is also derived. The merchant credential is derived in such a way that it can be associated with the root credential. The merchant credential is then communicated to each corresponding merchants 108. The merchant credential is then used to derive acceptance point device credentials, such as acceptance point device keys, for acceptance point devices 110. The acceptance point device credentials are then communicated to corresponding acceptance point devices 110. It should be noted that host 102 may generate the root credential, the merchant credential and acceptance point device credentials and communicate the merchant credential and the acceptance point device credentials to a merchant 108 and its associated acceptance point devices 110. Alternatively, each merchant 108 may generate its own acceptance point device credentials upon receiving its own unique merchant credential.

Selected issuer credentials are also communicated or downloaded to each acceptance point device 110. In communicating the issuer credentials, the acceptance point device credential may be used to authenticate the transfer. Acceptance point devices 110 may now use the downloaded issuer credentials to authenticate portable devices 106 from any issuers associated with the issuer credentials. In one exemplary embodiment, when a portable device 106 initiates a transaction with an acceptance point device 110, acceptance point device 110 determines the portable device credential associated with portable device 106. The portable device credential may then be used to authenticate portable device 106 based on the issuer credential associated with the issuer of portable device 106. For example, the issuer credential may be derived from the portable device credential and the derived issuer credential may be authenticated with the issuer credential found in acceptance point device 110. After this authentication, it is established that this portable device 106 is trusted within system 100 and can conduct loyalty transactions with this acceptance point device 110.

Using the above model of trust, an open system is provided where any issuers 104 and their associated portable devices 106 may securely participate in any loyalty programs 114 at any merchants 108 and their associated acceptance point devices 110. Also, issuers 104, portable devices 106, merchants 108, and acceptance point devices 110 may be securely added to system 100 by securely downloading the appropriate credentials to each entity. In this model of trust, the trust is between host 102 and each entity. Thus, trust is developed between each entity and host 102, which then allows entities in system 100 to trust each other.

D. Description of Role of Constituents in System 100

Constituents of system 100, such as issuers 106, merchants 108, sponsors 122, and an operator of host 102 can operate in an open (networked) system using the components described above. Issuers 104 can issue any number of portable devices 106 that may be used at any participating merchants' acceptance point devices 110. Also, issuers 104 can opt to sponsor loyalty programs 114 and determine which of their portable devices 106 are eligible for which loyalty programs 114.

Merchants 108 and their acceptance point devices 110 can participate in loyalty programs 114 that are offered by other parties. Also, information relating to selected loyalty programs 114 may be downloaded to selected acceptance point devices 110. Thus, a merchant 108 may have different acceptance point devices 110 that include different loyalty programs 114.

An operator of host 102 is the owner of host 102 and of the entire loyalty platform. Conventionally, an issuer or merchant running loyalty programs 114 had to be the owner of the loyalty platform. The operator in system 100 does not have to be an issuer or merchant and can be a third party provider, such as Visa.

Sponsors 112 can be any entities that desire to sponsor loyalty programs 114. Conventionally, sponsors for loyalty programs are limited to an issuer or a merchant. Sponsors 112 in system 100 may include issuers and merchants, as well as other parties, such as third parties, the operator of host 102, or any combination thereof.

The flexibility provided by system 100 enables multiple programs to be sponsored by any entity. Also, each program includes many parameters that may be changed dynamically and downloaded to specific acceptance point devices 110 and portable devices 106. Thus, programs may be tailored to specific portable devices 106 and for specific acceptance point devices 110.

Figure 2:
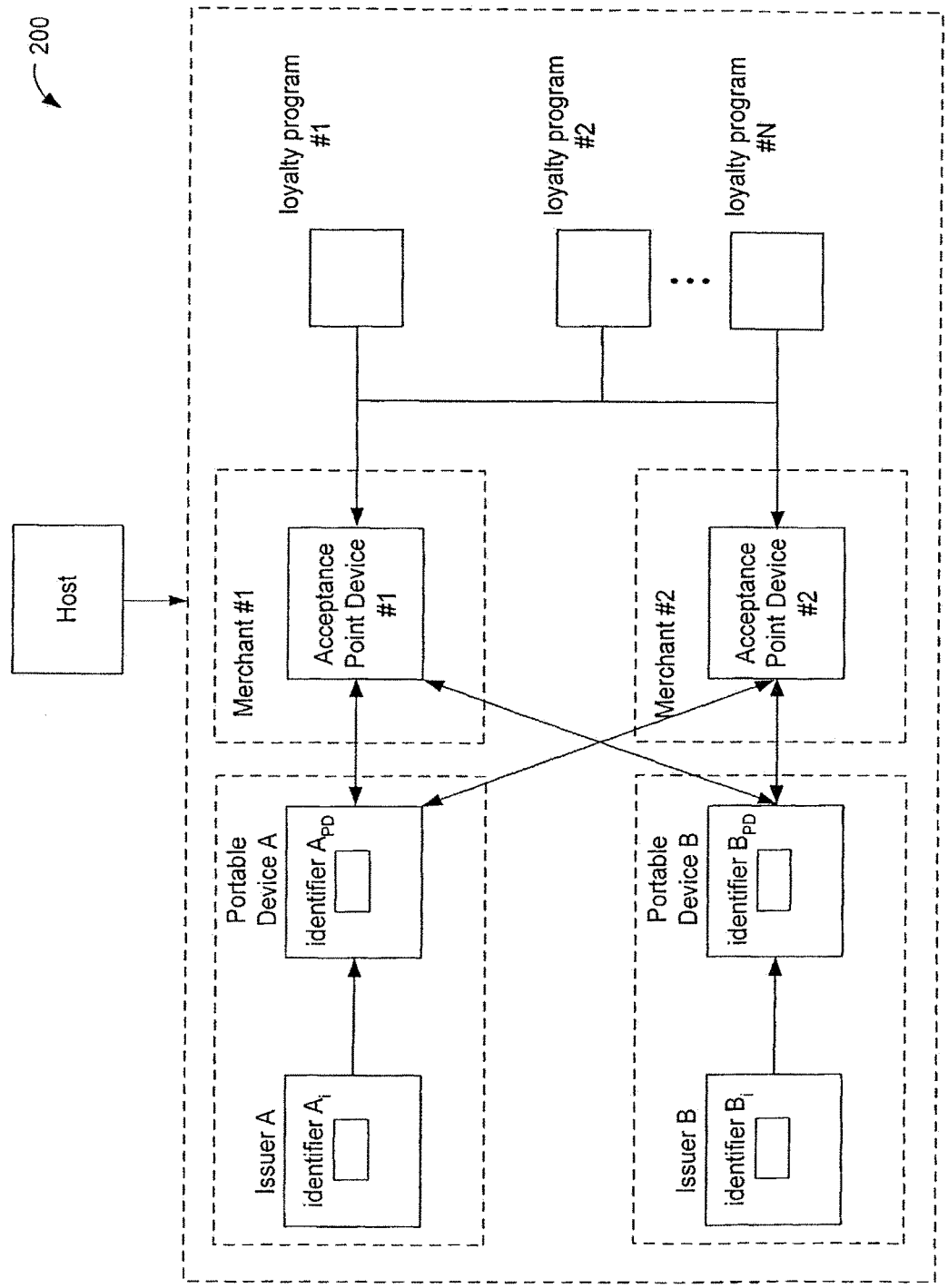
FIG. 2 is a simplified block diagram further illustrating an exemplary embodiment of the network-centric system for deploying a network-centric loyalty program.

FIG. 2 further illustrates an exemplary embodiment of system 100 for deploying a network-centric loyalty program. As shown, system 200 includes host 102, an issuer A, an issuer B, a portable device A, a portable device B, a merchant #1, a merchant #2, an acceptance point device #1, an acceptance point device #2, and information for loyalty programs #1, 2, . . . , N. Host 102 enables portable device A and portable device B to securely conduct loyalty transactions with either merchant #1 acceptance point devices or merchant #2 acceptance point devices.

Issuer A is a first issuer that issues portable device A for a customer. Issuer B is a second issuer that issues portable device B for a second customer. Issuers A and B have an associated issuer identifier $A_i$ and issuer identifier $B_i$, respectively. These identifiers are stored in host 102. In one embodiment, the issuer identifiers may be used to generate portable device identifiers. In this case, the unique identifier $A_i$ is used to provide an identifier $A_{PD}$ for portable device A where identifier $A_{PD}$ is specific to portable device A. Likewise, the unique identifier $B_i$ is used to provide an identifier $B_{PD}$ for portable device B where identifier $B_{PD}$ is specific to portable device B. Once portable device A and portable device B have been provided identifiers, the identifiers are registered with host 102. As mentioned above, issuers A and B can generate the portable device identifiers and register them with host 102. In another embodiment, host 102 may provide the issuer identifiers and portable device identifiers to each issuer and the issuer will supply the identifiers to the appropriate portable devices. In yet another embodiment, a third party may generate the issuer and/or portable device identifiers and send them to host 102 and issuers.

As mentioned above, the portable device identifiers may include portable device parameters. These parameters define which loyalty programs #1, 2, N portable device A and portable device B are eligible for.

Merchant #1 controls acceptance point device #1, which may be used to process transactions from portable device A and/or portable device B. Similarly, merchant #2 controls acceptance point device #2, which may be used to process transactions from portable device A and/or portable device B.

When an acceptance point device communicates with a portable device, the acceptance point device obtains the portable device identifier from the portable device. The acceptance point device then determines the issuer associated with the portable device identifier. For example, acceptance point device #1 or acceptance point device #2 may determines identifier $A_{PD}$ or identifier $B_{PD}$ from portable device A or portable device B and determine that identifier $A_{PD}$ or identifier $B_{PD}$ is associated with issuer A or issuer B. In one embodiment, identifier $A_{PD}$ is decoded to derive issuer identifier $A_i$ and an issuer identifier $A_i$ is retrieved from a database. The retrieved issuer identifier may then be used to authenticate portable device A. The same process may be followed with identifier $B_{PD}$ to determine that identifier $B_i$ is associated with issuer B.

Portable device parameters from portable device A are then determined. The portable device parameters may indicate one or more card group numbers with which portable device A is associated.

Once issuer identifier $A_i$ and the portable device parameters are known, acceptance point device #1 may determine the loyalty programs that portable device A is eligible for. In one example, issuer identifier $A_i$ is used to determine which loyalty programs #1-N issuer A is participating in. For example, issuer identifier $A_i$ may be associated with identifiers for certain loyalty programs #1-N. Once the loyalty programs are determined, the portable device parameters are matched with loyalty program parameters associated with the loyalty programs to determine which loyalty programs portable device A is eligible for. The loyalty parameters include card group numbers and parameters for processing loyalty transactions for the loyalty programs. Each card group number for a portable device may be associated with one or more loyalty programs. The card group numbers for portable device A are compared with the card group numbers in the loyalty parameters for each loyalty program associated with issuer A. If any card group numbers match, the matched card group numbers indicate that portable device A is eligible for the loyalty programs associated with the matched card group numbers. Loyalty transactions for the appropriate loyalty programs are then performed using, for example, the one or more loyalty parameters.

Once the appropriate loyalty transactions are performed, acceptance point device #1 can register incentives for portable device A at host 102 using the loyalty parameters. Additionally, acceptance point device #1 can perform the same services for portable device B and identifier $B_{PD}$. Merchant #2 and the acceptance point device #2 can also perform the same services as merchant #1 and acceptance point device #1.

Figure 3:
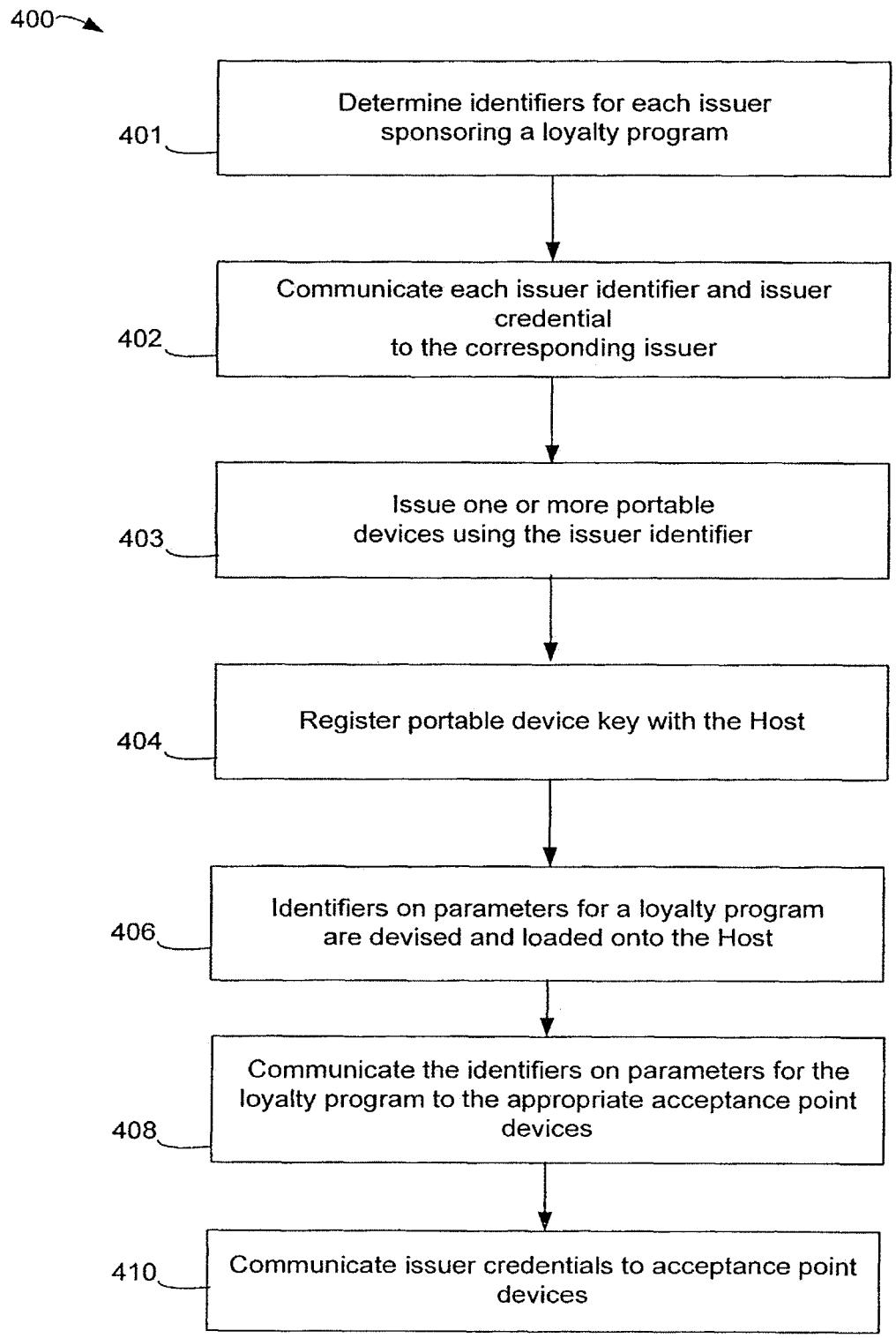
FIG. 3 depicts a simplified flowchart for a method for providing a loyalty program.

FIG. 3 depicts a simplified flow chart 400 for an exemplary method for providing one or more loyalty programs 114 in accordance with the present invention. In one exemplary embodiment, a loyalty program 114 may involve any number of portable devices 106 and any number of acceptance point devices 110. Additionally, any number of issuers 104, merchants 108, and sponsors 112 may be included in loyalty program 114.

In step 401, an issuer identifier and an issuer credential for each issuer sponsoring a loyalty program 114 are determined. The issuer identifiers and credentials are then stored in a database accessible by host 102. Each issuer identifier is used to uniquely identify an issuer 104. Each issuer credential is used to generate portable device credentials to allow portable devices issued by the issuer to be authenticated.

In step 402, each issuer identifier and issuer credential is communicated to the corresponding issuer 104. In one embodiment, host 102 or a third party may communicate the issuer identifiers and credentials to issuers 104. The communication of issuer identifiers and credentials may be through any kind of communication means, such as the Internet, a wireless network, a wireline network, and the like. The communication of the issuer identifiers and credentials may also be secured using well known encryption/decryption algorithms and security protocols.

Once issuers 104 receive their corresponding issuer identifier and issuer credentials, in step 403, each issuer 104 may issue one or more portable devices 106 using its issuer identifier and issuer credential. For example, issuer 104 may issue a portable device 106 with a portable device identifier and credential derived from the issuer identifier and the issuer credential. In another embodiment, the portable device identifier may be provided by host 102 or a third party. Issuer 104 may issue any number of portable devices 106 for use in system 100 as long as the portable device identifiers and credentials are associated with the issuer identifier and credential.

In step 404, the portable device identifier and credentials are registered with host 102. Host 102 may then store the portable device identifiers and credentials in a database. In another embodiment, the portable device identifiers and credentials are provided by host 102 to issuer 104 and the registration step is thus not necessary. The communication of the portable device identifiers and credentials to host 102 may be secured using well known encryption/decryption algorithms and security protocols.

In step 406, identifiers and parameters for any number of loyalty programs 114 are defined and loaded onto host 102. For example, identifiers and parameters used to implement any of the examples of loyalty programs described below may be used. Specific portable devices 106, specific issuers 104, specific merchants 108, specific acceptance point devices 110, and specific sponsors 112 may be included in a loyalty program 114. Also, specific incentives for certain loyalty transactions may be specified. Also, card group numbers or other criteria that are associated with loyalty programs 114 are defined in the parameters.

In step 408, host 102 communicates information for the identifiers and the parameters for loyalty programs 114 to acceptance point devices 110. Different acceptance point devices 110 may receive different information relating to loyalty programs 114. In one exemplary embodiment, the information includes the issuer identifiers for the participating issuers 104 and parameters for loyalty programs 114 including the card group numbers for the eligible portable devices 106. Using the issuer identifier and loyalty parameters, acceptance point devices 110 may specifically allocate incentives to portable devices 106 of issuers 104 for specific loyalty transactions.

In step 408, host 102 also communicates the issuer credentials to acceptance point devices 110. The issuer credentials will be used to authenticate portable devices 106.

Figure 4:
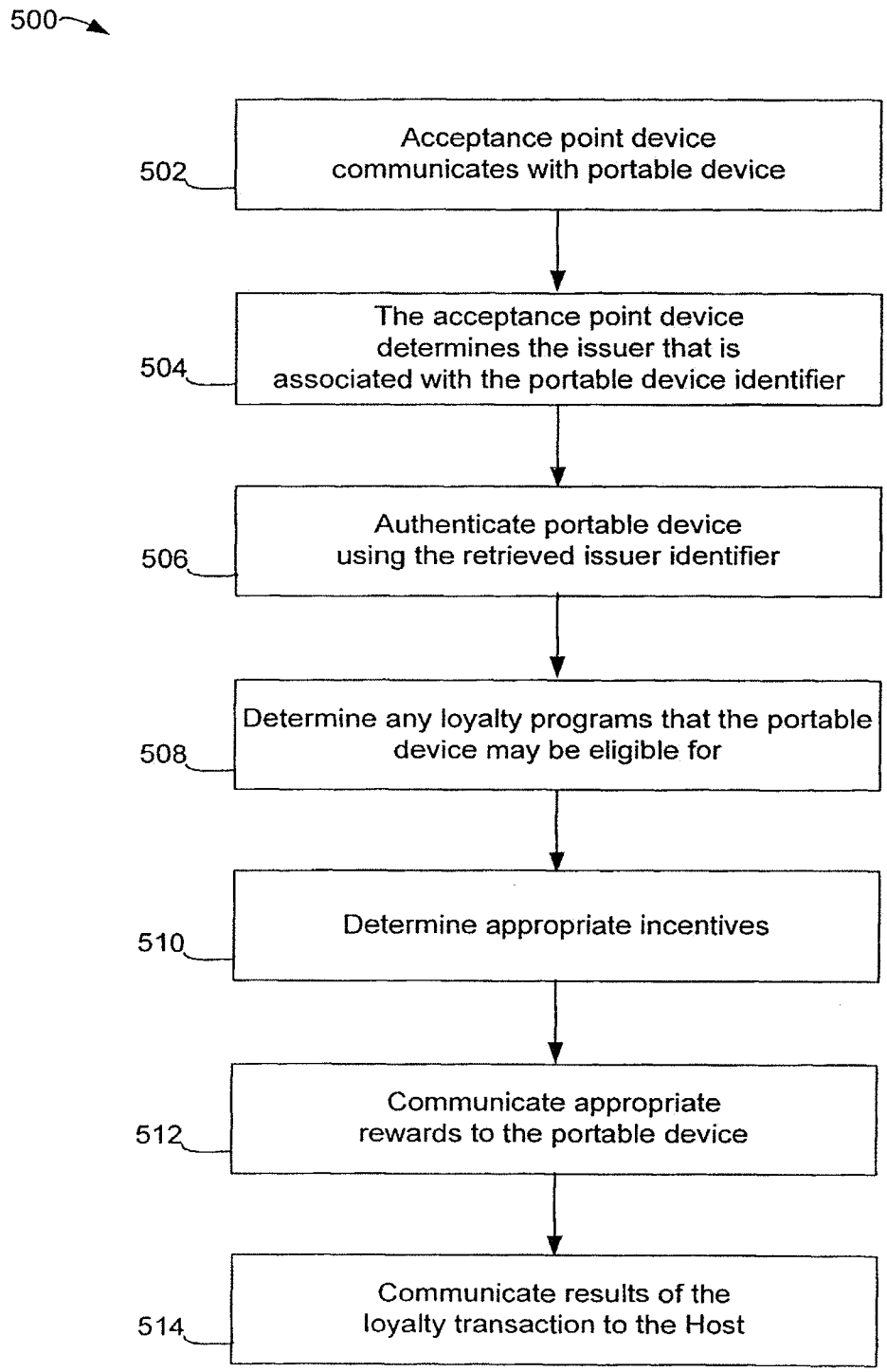
FIG. 4 depicts a simplified flowchart for processing a loyalty transaction in a loyalty program according to one exemplary embodiment of the present invention.

Once loyalty programs 114 have been initialized as described above, loyalty transactions may be processed by acceptance point devices 110. FIG. 4 illustrates a simplified flowchart 500 for processing a loyalty transaction in a loyalty program 114 according to one exemplary embodiment of the present invention.

In step 502, communication is established between acceptance point device 110 and portable device 106. In one exemplary embodiment, acceptance point device 110 and portable device 106 communicate to determine a portable device identifier associated with the portable device 106. The identifier may include portable device parameters for portable device 106 or portable device parameters may be further determined.

In step 504, acceptance point device 110 determines the issuer that is associated with the portable device identifier. For example, the issuer identifier may be derived from the portable device identifier. In order to authenticate the derived issuer identifier, an authentic issuer identifier that is associated with the portable device identifier may be retrieved from acceptance point device 110.

In step 506, acceptance device 110 can authenticate portable device 106 using the retrieved issuer authentication key.

In step 508, acceptance point device 110 determines any loyalty programs that portable device 106 may be eligible for. For example, acceptance point device 110 uses the portable device parameters associated with the portable device identifier to identify loyalty programs for the issuer 104 that portable device 106 is eligible for. Once the applicable loyalty programs are determined, in step 510, acceptance point device 110 determines the appropriate incentives for the loyalty programs using the loyalty parameters associated with any loyalty programs 114.

In step 512, acceptance point device 110 updates and communicates the appropriate incentives to portable device 106. Thus, portable device 106 now includes information that may be used in a future transaction to redeem the incentive accrued from the loyalty transaction.

In step 514, acceptance point device 110 communicates the results of the loyalty transaction to host 102. Host 102 can then produce records or reports on all the transactions received from acceptance point devices 110.

Accordingly, embodiments of the present invention allow a network centric system to deploy loyalty programs for any number of issuers, merchants, portable devices, and acceptance point devices. Host 102 of the network centric system is used to deploy the loyalty programs and collect information relating to transactions at merchants participating in the loyalty programs. The use of identifiers to uniquely identify each issuer and each portable device allows merchants to offer loyalty programs for specific issuers and for specific portable devices at specific merchants' acceptance point devices participating in the network centric system.

Figure 5:
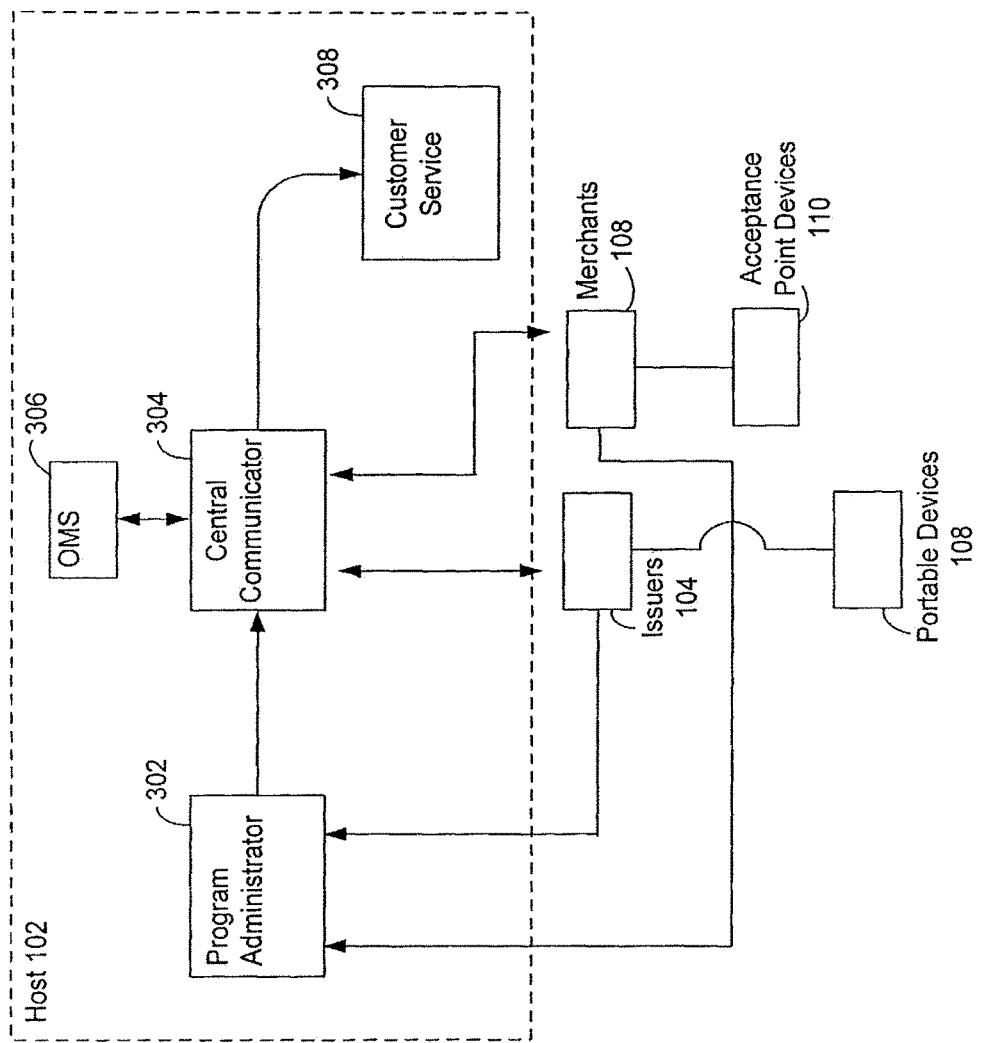
FIG. 5 depicts a simplified block diagram of a host according to one exemplary embodiment.

FIG. 5 depicts a simplified block diagram of host 102 according to one exemplary embodiment of the present invention. As shown, host 102, issuers 104, and merchants 108 are included. Host 102 includes a program administrator system 302, a central communicator 304, operations management system (OMS) system 306, and a customer service system 308. Using this configuration, host 102 can deploy a loyalty program 114 in a fast and efficient manner.

Program administrator system 302 interacts with issuers 104, merchants 108, and other third party sponsors (not shown) to administer loyalty programs. Program administrator system 302 also keeps track of issuers 104, merchants 108 and other third party sponsors and the corresponding loyalty programs that they are sponsoring and provides guidelines for participation within the network centric system. Additionally, program administrator system 302 manages the issuer credentials associated with issuers 104, portable devices 108 and their associated identifiers and the loyalty programs associated with the issuer identifiers. The standards for initializing portable devices 106 and acceptance point devices 110 to ensure interoperability within network-centric system 100 are also provided by program administrator system 302. Program administrator system 302 then communicates information relating to the loyalty programs that are associated with the identifiers of issuers 104 and portable devices 108 to central communicator 304. Central communicator 304, in turn, communicates the information to merchants 108 and their acceptance point devices 110.

Operations management system (OMS) 306 manages the operations of host 102. OMS 306 provides defined tasks for supporting and maintaining the network centric platform.

Customer service system 308 is used to provide a gateway for providing customer service to issuers 104, merchants 108, third party sponsors and users associated with portable devices 110. Customer service system 308 can provide settlement resolution and other settlement services on behalf of unrelated participants within network centric system 100.

Central communicator 304 communicates information relating to the loyalty programs to merchants 108, issuers 104, and third party sponsors. Also, central communicator 304 receives transaction information from merchants 108. Upon receiving the transaction information, central communicator 304 then can communicate the information to OMS 306, which can create reports and evaluate the transactions. Central communicator 304 also provides standards for configuring host communication and processing ties between unrelated hosts.

Other features that may be provided by embodiments of the present invention include an identifier expiration policy that allows participants to enter short term agreements to provide loyalty programs between shared customers. Additionally, network centric system 100 allows for routing of the incentives of loyalty transactions among unlimited participants to the interested sponsors of loyalty programs 114. Also, authentication of portable device 110 is provided that allows multiple participants to store incentive data on a single chip of portable device 106. Thus, multiple identifiers may be stored on a portable device 106. Also, host 102 prevents sharing of database information between unrelated loyalty program sponsors residing on host 102. Moreover, the privacy of all participants in the system including portable device holders, merchants, issuers, and loyalty program sponsors is protected by host 102. Additionally, host 102 provides standards for initializing portable devices 110 and acceptance point devices 110 to ensure interoperability within network-centric system 100.

The following provide examples according to exemplary embodiments of the present invention. First, issuer A issues a portable device A and issuer B issues a portable device B. Portable device A includes a portable device identifier $A_{PD}$ that is derived using an issuer identifier $A_i$ and portable device B includes a portable device identifier $B_{PD}$ that is derived using an issuer identifier $B_i$. Portable device A and its identifier $A_{PD}$ and portable device 13 and its identifier $B_{PD}$ are registered with host 102. Portable device A and portable device B include portable device parameters, respectively. For example, the portable device parameters may indicate the portable devices are associated with a card group #1.

Merchant #1 and merchant #2 deploy acceptance point devices 110 in their respective stores across the country. Merchant #1, issuer A, and issuer B agree to jointly sponsor a loyalty program offering a $5 discount coupon at merchant #2 stores for purchases of $25 or more made by issuer A or issuer B portable device holders at any merchant #1 acceptance point devices 110. Loyalty parameters for the loyalty program are then loaded onto host 102 and automatically downloaded to acceptance point devices 110 for merchant #1 and merchant #2. The parameters include the parameter that indicates card group #1 for issuer A and card group #2 for issuer B are associated with this loyalty program and parameters that enable loyalty transactions to be conducted for the loyalty program. Thus, all portable devices associated with issuer A in card group #1 and issuer B in card group #2 are eligible for the loyalty program.

When a portable device 106 associated with either issuer A or issuer B communicates with an acceptance point device 110 at merchant #1, the identifier $A_{PD}$ or identifier $B_{PD}$ is determined by acceptance point device 110. Acceptance point device 110 then determines the issuer associated with the received identifier.

Portable device parameters are determined by acceptance point device 110. The portable device parameters are then used to determine the loyalty programs portable device 106 is eligible for. For example, the portable device parameter of card group #1 for portable device A is matched with the card group #1 loyalty parameter for the loyalty program for issuer A and the portable device parameter of card group #2 for portable device B is matched with the card group #2 loyalty parameter for the loyalty program for issuer B. Then, acceptance point device 110 can determine that portable device A or B is eligible for that loyalty program. Thus, any single purchase of $25 or more at a merchant #1 location causes acceptance point device 110 to place a $5 discount coupon on portable device A or portable device B. The $5 discount can then be redeemed if the same portable device is used to make a purchase at any merchant #2 store via the corresponding acceptance point device 110.

In another example, issuer C and issuer D issue portable devices to residents in the southeast region of the United States and each portable device and its identifier is registered with host 102. Issuer C issues a portable device C and issuer D issues a portable device D. Portable device C includes an identifier $C_{PD}$ that is derived using an issuer identifier $C_i$ and portable device D includes an identifier $D_{PD}$ that is derived using an issuer identifier $D_i$. Portable device C and its identifier $C_{PD}$ and portable device D and its identifier $D_{PD}$ are registered with host 102. Portable device parameters that are used to determine the loyalty program portable device C and D are eligible for are associated with portable device C and D, respectively. For example, the portable device parameters may indicate the portable devices are associated with a card group #1.

Merchant Z deploys acceptance point devices 110 in store locations in the same region. Issuer C and merchant Z agree to co-sponsor a loyalty program that offers a ten percent discount on all purchases over $10 that are made with an issuer C portable device at merchant Z locations. Issuer D and merchant Z agree to co-sponsor a loyalty program that offers a free candy bar if an issuer D portable device is used to purchase two candy bars made by the same manufacturer. Loyalty parameters for both loyalty programs are then loaded onto host 102 and automatically downloaded to merchant Z acceptance point devices 110. The parameters include the parameter that indicates card group #1 is associated with the two loyalty programs and parameters that enable processing of loyalty transactions. Thus, all portable devices associated with issuer C and issuer D in card group #1 are rendered eligible for the loyalty programs. Both programs are registered with host 102 and automatically downloaded to merchant Z acceptance point devices 110.

When a portable device 106 associated with either issuer C or issuer D communicates with an acceptance point device 110 at merchant Z, the identifier $C_{PD}$ or the identifier $D_{PD}$ is determined. Acceptance point device 110 then determines the issuer associated with the determined identifier.

Portable device parameters are then determined by acceptance point device 110. The portable device parameters are used to determine the loyalty programs portable device 106 is eligible for. For example, the portable device parameter card group #1 is matched with the card group #1 loyalty parameter for the loyalty program. Acceptance point device 110 can determine the loyalty programs that portable device 106 is eligible for using matched parameters. Portable device holders of issuer C automatically receive a ten percent discount off of their purchases while portable device holders of issuer D automatically receive free candy bars when qualifying purchases are made at merchant Z. Merchant Z then sends all the loyalty transactions at the end of the day to host 102, which determines the total value of the transactions and generates financial transactions to move funds, as appropriate, between loyalty sponsors.

In another example, issuers E, F, and G issue portable devices 106 to individuals living across the United States and their respective portable devices 106 and their associated identifiers are registered with host 102. First, issuer E issues a portable device E, issuer F issues a portable device F, and issuer G issues a portable device G. Portable device E includes a identifier $E_{PD}$ that is derived using an issuer identifier $E_i$, portable device F includes an identifier $F_{PD}$ that is derived using an issuer identifier $F_i$, and portable device G includes an identifier $G_{PD}$ that is derived using an issuer identifier $F_i$. Portable device E and its identifier $E_{PD}$, portable device F and its identifier $F_{PD}$, and portable device G and its identifier $G_{PD}$ are registered with host 102. Portable device $F_{PD}$, portable device F, and portable device G include portable device parameters, respectively. For example, the portable device parameters for each portable device 106 may indicate the portable devices are associated with card group #1.

Merchant Q deploys acceptance point devices 110 in all of its stores across the country and registers each acceptance point device 110 with host 102. A product manufacturer sponsors a loyalty program that provides a twenty-five percent discount off all purchases of product K made by portable devices 106 from issuers E, F, and G. Loyalty parameters for the loyalty program are then loaded onto host 102 and automatically downloaded to merchant Q acceptance point devices 110. The parameters include the parameter that indicates that a card group #1 is associated with this loyalty program and parameters that enable processing of loyalty transactions for the loyalty program. Thus, all portable devices 106 associated with issuers E, F, and G in card group #1 are rendered eligible for the loyalty program. The loyalty program is registered at host 102 and automatically downloaded to all merchant Q acceptance point devices 110.

When a portable device 106 associated with either issuers E, F, or G communicates with an acceptance point device 110 at merchant Q, identifier $E_{PD}$, identifier $E_{PD}$, or identifier $G_{PD}$ is determined by acceptance point device 110. Acceptance point device 110 then determines the issuer associated with the determined identifier. Portable device parameters are then determined by acceptance point device 110. The portable device parameters are then used to determine the loyalty program portable device 106 is eligible for. For example, the portable device parameter card group #1 is compared with the card group #1 loyalty parameter for the loyalty program. If the parameters match, acceptance point device 110 then processes the loyalty transaction. Users of portable devices 106 from issuers E, F, and G automatically receive the appropriate discount when their portable device 106 are used to purchase the specified product at merchant Q's acceptance point devices 110.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
    determining, by a host computer, an issuer identifier for an issuer in a plurality of issuers, the issuer identifier usable to generate a portable device identifier for a portable device issued by the issuer, wherein the portable device identifier is enabled to be used at an acceptance point device associated with a merchant that is remote from the host computer and the issuer;
    deriving, by the host computer, an issuer credential for the issuer from a root credential associated with the host computer, wherein the issuer credential is usable to derive a portable device credential that is associated with the portable device;
    storing, by the host computer, the portable device identifier, the portable device credential, and one or more loyalty parameters associated with one or more eligible loyalty programs in the host computer;
    determining the one or more eligible loyalty programs based on the portable device identifier and the portable device credential; and
    after determining the one or more eligible loyalty programs, performing the one or more eligible loyalty programs.

2. The method of claim 1, further comprising providing, by the host computer, the issuer identifier and the issuer credential to the issuer.

3. The method of claim 2, wherein the portable device is configured to conduct purchases.

4. The method of claim 1, wherein determining the one or more eligible loyalty programs is performed by the acceptance point device.

5. The method of claim 1 further comprising:
    providing one or more portable device parameters to the portable device.

6. The method of claim 5, wherein the portable device is a credit card.

7. The method of claim 1 further comprising:
    providing a unique acceptance point device credential to an acceptance point device.

8. The method of claim 1, wherein the acceptance point device is located at a store operated by the merchant.

9. The method of claim 1, wherein determining the one or more eligible loyalty programs is performed by the acceptance point device, and wherein the portable device credential enables the acceptance point device to authenticate the portable device using the issuer credential.

10. The method of claim 1, wherein determining the one or more eligible loyalty programs is performed by the acceptance point device, and wherein the acceptance point device is configured to update and communicate appropriate incentives to the portable device.

11. The method of claim 1, wherein determining the one or more eligible loyalty programs is performed by the acceptance point device and wherein the method further comprises:
    receiving a record of a loyalty transaction processed at the acceptance point device; and
    associating the loyalty transaction with the issuer identifier.

12. The method of claim 1, wherein the host computer is configured to establish trust with each issuer in the plurality of issuers, with the portable device, and with an acceptance point device.

13. The method of claim 1, wherein the one or more loyalty parameters are associated with the issuer that provides the one or more eligible loyalty programs.

14. The method of claim 1, wherein the one or more loyalty parameters are associated with the merchant that provides the one or more eligible loyalty programs.

15. The method of claim 1, wherein the host computer corresponds with a plurality of links between issuers and the host computer and merchants and the host computer, including the link between the issuer and the host computer.

16. A system comprising:
    a host processor operated by a host, the host processor configured to
        determine an issuer identifier for an issuer in a plurality of issuers, the issuer identifier usable to generate a portable device identifier for a portable device issued by the issuer, wherein the portable device identifier is enabled to be used at an acceptance point device associated with a merchant that is remote from the host processor and the issuer,
        derive an issuer credential for the issuer from a root credential associated with the host, wherein the issuer credential is usable to derive a portable device credential that is associated with the portable device, and
        store the portable device identifier, the portable device credential, and one or more loyalty parameters associated with one or more eligible loyalty programs in the host; and
    the acceptance point device configured to
        determine the one or more eligible loyalty programs based on the portable device identifier and the portable device credential, and
        after determining the one or more eligible loyalty programs, perform the one or more eligible loyalty programs.

17. The system of claim 16, wherein the portable device is a smartcard, smart media card, a cellular phone, a personal digital assistant (PDA), a pager, a payment card, a security card, a transponder, or an access card.

18. The system of claim 16, wherein the acceptance point device is a point of sale (POS) device, a cellular phone, a personal digital assistant (PDA), a computer, a handheld specialized reader, a set-top box, a kiosk, an electronic cash register (ECR), an automated teller machine (ATM), a virtual cash register (VCR), a security system, or an access system.

19. The system of claim 16, wherein the issuer identifier is maintained by the host processor.

20. The system of claim 16 further comprising a sponsor computer in communication with the host processor.

21. The system of claim 16, wherein the portable device is a credit card.

* * * * *